United States Patent [19]
Yang, Jr.

[11] Patent Number: 5,986,823
[45] Date of Patent: Nov. 16, 1999

[54] FRESNEL MAGNIFYING LENS FOR FORMING A HAND-HELD POCKET-SIZED HYBRID ASSEMBLY AND METHOD THEREFOR OF PROVIDING THE HYBRID ASSEMBLY

[76] Inventor: Peter S. Yang, Jr., 379 Canal Rd., South Bound Brook, N.J. 08880

[21] Appl. No.: 08/829,611

[22] Filed: Mar. 31, 1997

[51] Int. Cl.$^6$ .............................. G02B 3/08; G02B 27/02
[52] U.S. Cl. ......................... 359/742; 359/803; D16/135
[58] Field of Search ................... 359/742, 743, 359/802, 803; D16/134, 135, 136

[56] References Cited

U.S. PATENT DOCUMENTS

| | | | |
|---|---|---|---|
| D. 406,156 | 2/1999 | Raymond | D16/135 |
| 3,140,883 | 7/1964 | Anthony | 359/742 |
| 3,409,347 | 11/1968 | Vogel | 359/742 |
| 3,797,917 | 3/1974 | Barbour | 359/742 |
| 4,044,889 | 8/1977 | Orentreich et al. | 359/743 |
| 4,257,401 | 3/1981 | Daniels | 359/742 |
| 4,510,488 | 4/1985 | St. Jean et al. | 340/567 |
| 5,048,928 | 9/1991 | Davis | 359/742 |
| 5,412,199 | 5/1995 | Finkelstein et al. . | |
| 5,434,405 | 7/1995 | Finkelstein et al. . | |

*Primary Examiner*—Scott J. Sugarman
*Attorney, Agent, or Firm*—Antonelli, Terry, Stout & Kraus, LLP

[57] ABSTRACT

A fresnel magnifying lens for forming a hand-held, pocket-sized hybrid assembly of the lens and another object or objects. The lens is provided with at least one hole for use with a fastener to detachably or permanently couple the lens to the other object in a manner which allows a selective magnified hand-held viewing, through the lens, of both the other object, as well as different objects. The coupling of the lens to the other object is such that the lens can be slidably moved, using the fastener which couples the lens to the other object as a pivot point, to permit the lens to be used to view different objects which are not part of that hybrid assembly. The pocket-sized fresnel magnifying lens can thereby be attached onto a variety of objects, for example, marketing objects, such as credit cards, debit cards, ID cards, pocket calenders, schedules, telecards, magnetic note holders, key rings, etc., thereby permitting improved accessibility of the visual aid provided for by the fresnel lens to individuals and consumers. This piggy backing scheme of the lens onto such marketing objects allows the marketing objects to be even more powerful marketing tools in view of the inherent accessibility of the fresnel lens.

7 Claims, 6 Drawing Sheets

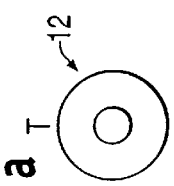
FIG. 1a
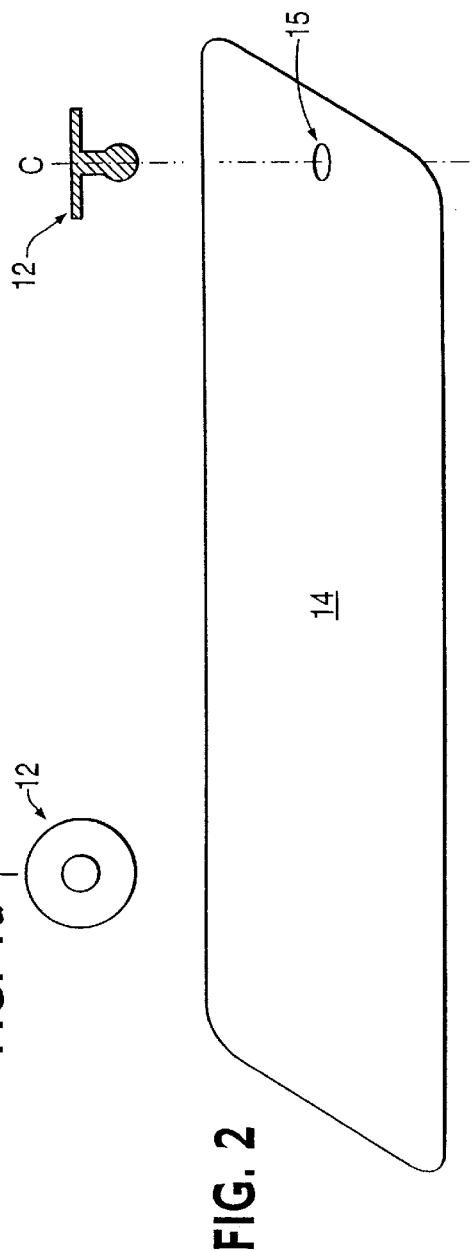
FIG. 1b
FIG. 2
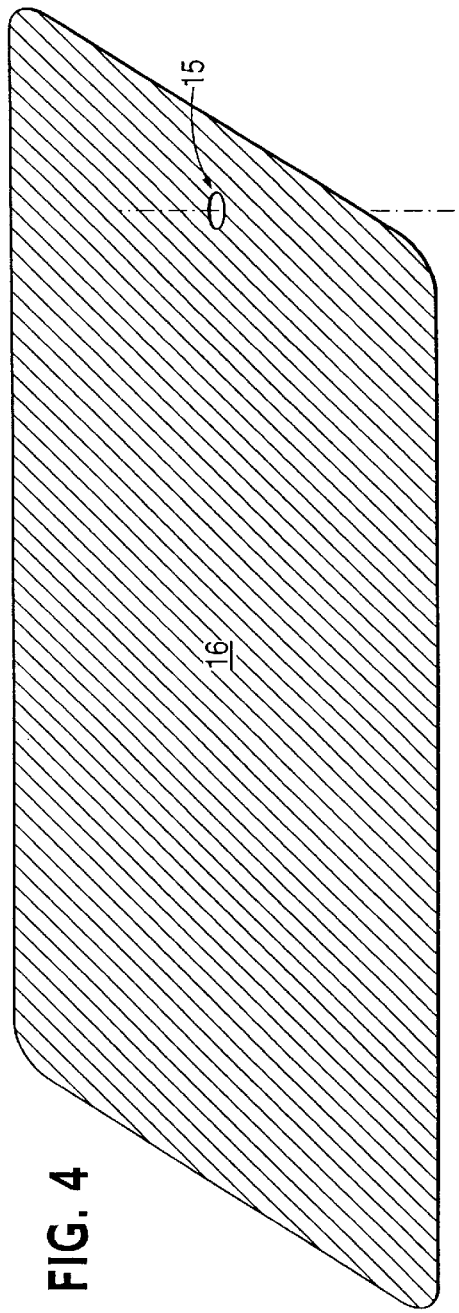
FIG. 4

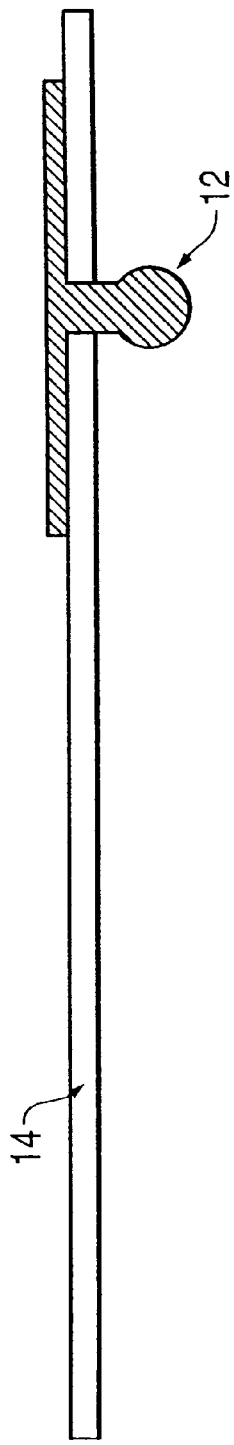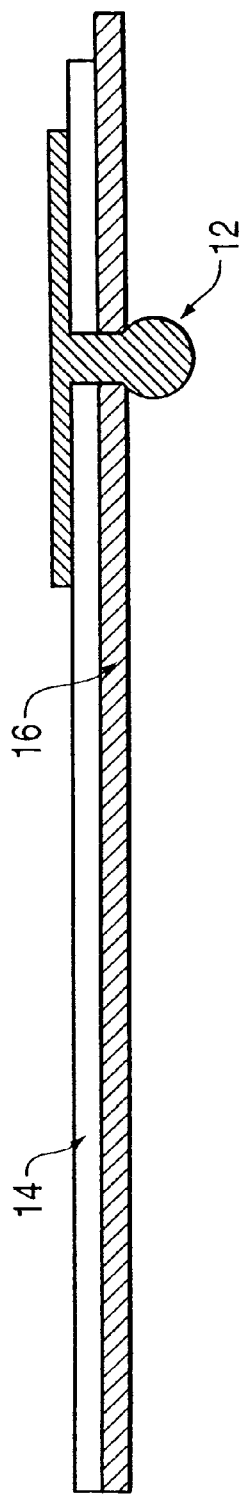

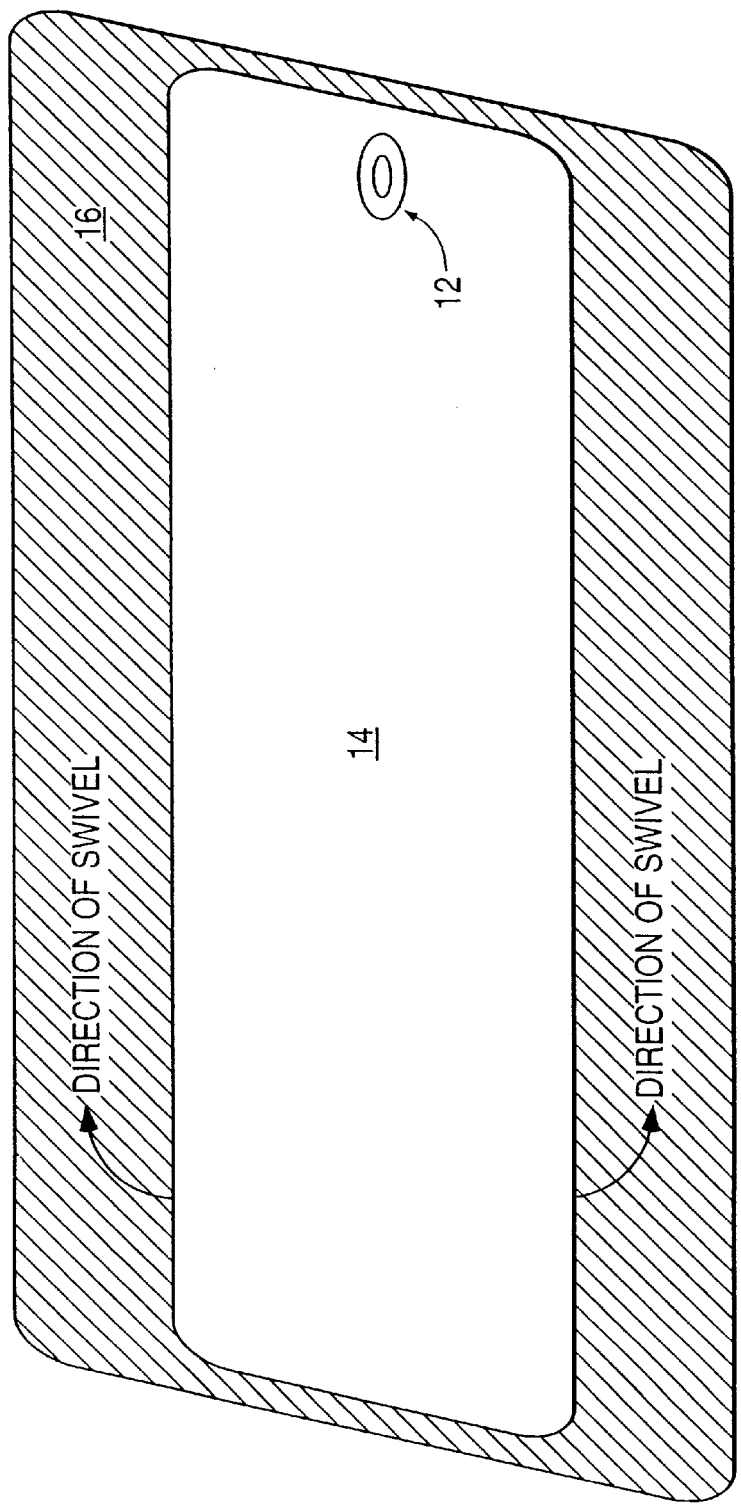

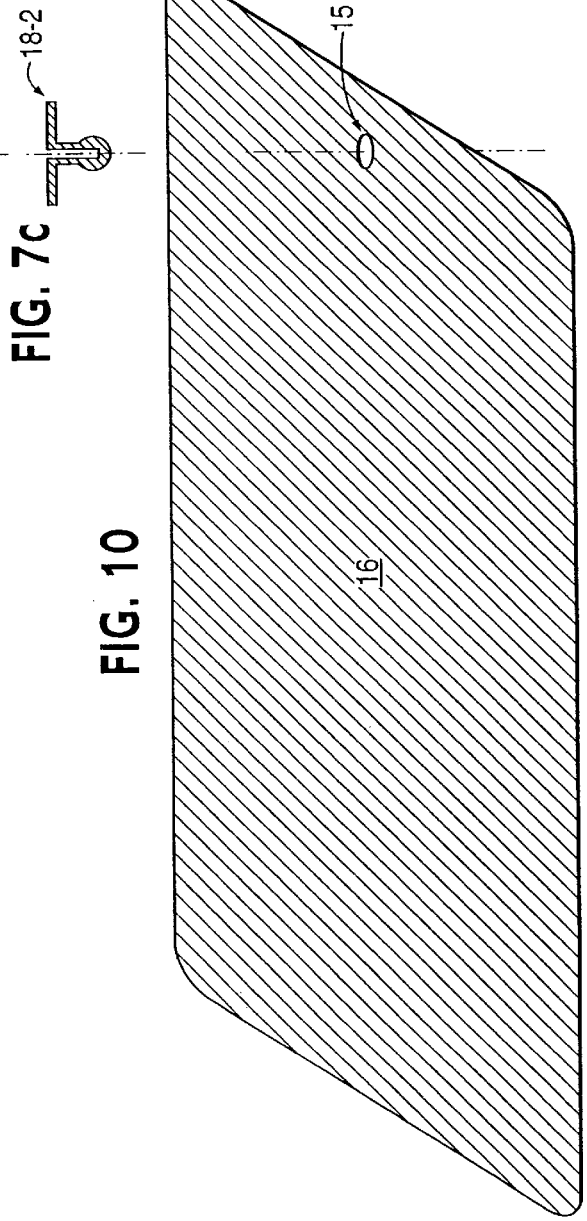

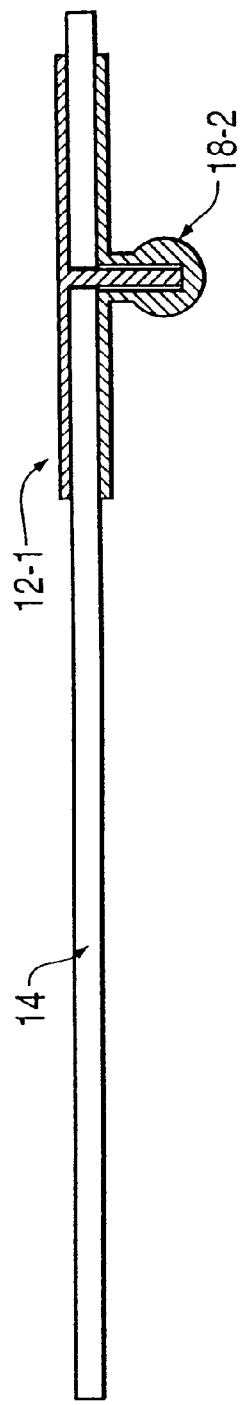
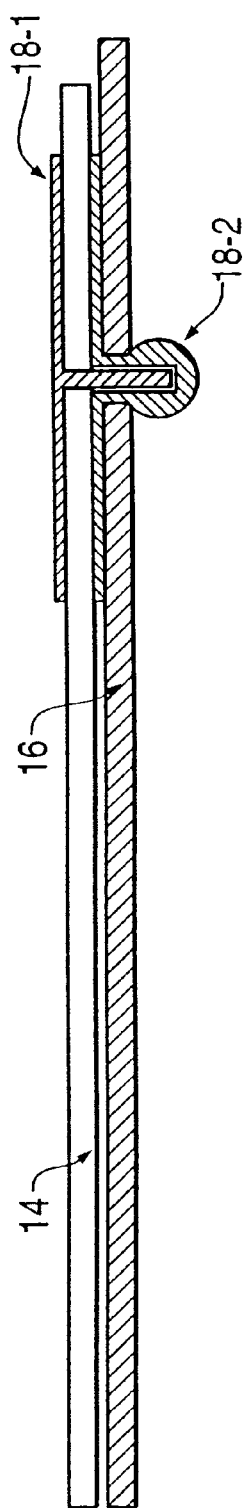

FRESNEL MAGNIFYING LENS FOR FORMING A HAND-HELD POCKET-SIZED HYBRID ASSEMBLY AND METHOD THEREFOR OF PROVIDING THE HYBRID ASSEMBLY

FIELD OF INVENTION

This invention relates to fresnel lenses, specifically, pocket sized fresnel magnifying lenses, to be externally attached onto other marketing objects, for creating new hybridized items.

BACKGROUND OF PRIOR ART

Many common marketing objects like credit/debit cards, telecards, pocket calendars, magnetic note holders, etc. contain printed or encoded information which users have difficulty reading, thus affecting their ability to use them. Most solutions are either economically unfeasible, deviate too much from normal and traditional marketing practices, or are simply impractical.

In 1995 U.S. Pat. No. 5,412,199, titled "Credit card with magnifying lens" and U.S. Pat. No. 5,434,405, titled "Credit card with a magnifying lens formed in a section of the transparent core" focused mostly on how a fresnel magnifier could be built into a plastic credit card. They described a machine readable card that could be encoded with all the necessary information needed to be a financial card and housing a fresnel window used as a visual aid to check the accuracy of receipts (printed on paper) at point of sale.

Finkelstein et al have cited many references in their patents (their lists could also be considered as prior art for this application) but none has shown any relevancy to my invention. My invention is a fresnel magnifier with a simple coupling device which allows the lens to be externally attached onto other objects, thus forming a hybrid assembly of the lens and another object or objects.

OBJECTS AND ADVANTAGES

In previous inventions the fresnel magnifying window is an integral part of the credit card itself, built into a card that serves dual functions. In contrast, my magnifier and its attached objects retain their own separate identities and functions. The components of my invention can be taken apart at will.

This detachability option enables the users to also read what is printed on the attached objects themselves; a most important benefit when the attached objects contain small prints. This self-directing feature is not possible with Finkelstein's magnifying window, an important distinction differentiating our inventions.

My invention adds a magnifying option to anything to which it is attached, thus enhancing the utilities of a wide variety of familiar marketing objects, such as pocket calendars, schedules, credit/debit cards, telecards, I.D. cards, business and membership cards, magnetic note holders, etc.

The external attachment of the lens removes any/all potential conflicts as to size, design and location of graphics or data on the attached item(s), a serious and limiting factor that has to be addressed whenever the lens becomes an integral part of any object.

The possibility of such hybridized products are too numerous to be individually cited. The synergism achieved from the attachment makes both the magnifier and its attached objects more versatile, user friendly, interactive, convenient and accessible. It also eliminated the need of carrying and storing of separate items.

This "piggy backing" approach onto objects that are commonly found on a person or in a home/office provides easy access of a visual aid for millions of people and improves the effectiveness of a marketing tool for the business community.

Since "Presbyopia" is a well known condition around the world and it is practically universal among the forty-plus men and women, having an easily accessible magnifier is invaluable to everyone, particularly the business communities who are engaged in marketing and advertising. This "Piggy back" delivery is unique; It improves the accessibility of a visual aid for millions of people, delivering visual assistance at precisely the moment when it is needed.

SUMMARY OF THE INVENTION

The invention features a fresnel magnifying lens with preplanned hole(s) which enables it to accept a fastener thus externally attached onto many common marketing objects, thereby instantly creating a hybrid assembly of the lens and another object or objects. Specifically, the invention features a fresnel magnifying lens for forming a hand-held pocket-sized hybrid assembly of the lens and another object or objects. The lens is provided with at least one hole for use with a fastener to detachably or permanently couple the lens to another object in a manner which allows a selective magnified hand-held viewing, through the lens, of both that other object, as well as other, different objects. In accordance with this scheme, the coupling of the lens to another object is such that the lens can be slidably moved, using the fastener which couples the lens to that other object as a pivot point, to permit the lens to be used to view different objects which are not part of that hybrid assembly.

A BRIEF DESCRIPTION OF THE DRAWINGS

FIG. 1, is a top and a cross sectional views of a one part snap or plug (12).

FIG. 2 is a top view of a fresnel magnifying lens(14) with a preplanned hole (15).

FIG. 3 is an enlarged cross sectional view of a snap (12), through a preplanned hole (15) on a fresnel magnifying lens (14).

FIG. 4 is a top view of a planar object (e.g. a plastic card) with a preplanned hole (15).

FIG. 5 is an enlarged cross sectional view of a snap or plug (12), coupling together a fresnel magnifying lens (14) and a plastic card (16).

FIG. 6 is the top view of a completed hybrid assembly: a part snap or plug (12), holding together a fresnel magnifying lens (14), and a plastic card (16).

FIG. 7 is a top and a cross sectional views of a two parts snap or plug (12-1 and 12-2).

FIG. 8 is a top view of a fresnel magnifying lens (14) with a preplanned hole (1 5).

FIG. 9 shows a cross sectional view of part one (12-1) of a two parts snap or plug, through a preplanned hole (15) on a fresnel magnifying lens (14), into part two (12-2) of a two parts snap or plug.

FIG. 10 is a top view of a planar object (e.g. a plastic card) with a preplanned hole (15).

FIG. 11 is a cross sectional view of a two parts snap or plug (12-1 and 12-2), coupling together the fresnel magnifying lens (14) and the plastic card (16).

A DESCRIPTION OF THE PREFERRED EMBODIMENT

Figure 12:
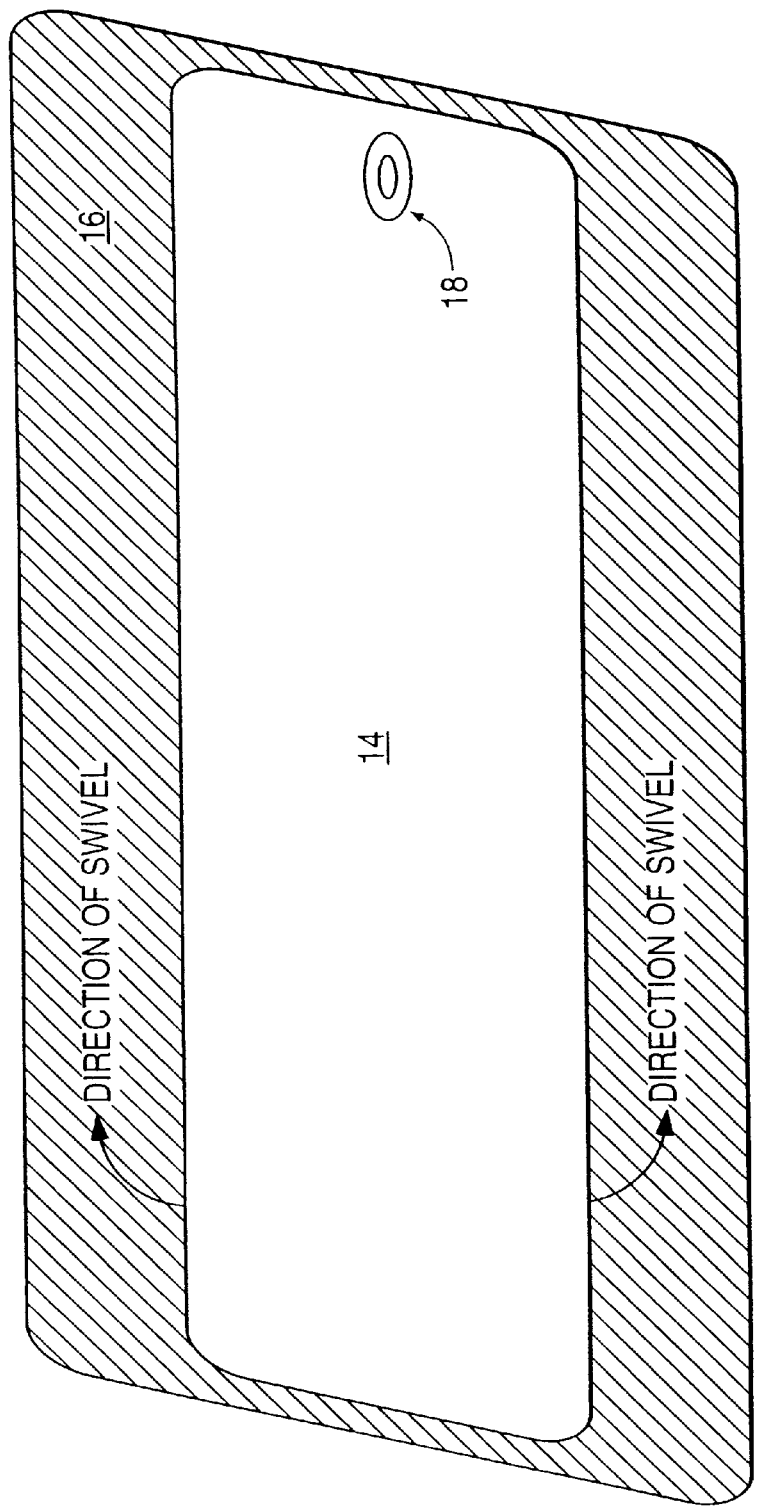
FIG. 12 is the top view of a completed hybrid assembly: a two parts snap or plug (12-1 and 12-2), holding together a fresnel magnifying lens (14), and a plastic card (16).

FIGS. 1–6 show an embodiment of my invention with a one part fastening device.

FIGS. 7–12 show the embodiment of my invention with a two parts fastening device or system. These embodiments both show how the fresnel magnifying lens is attached to a planar object, i.e. a plastic card by the snap or plug through the preplanned holes.

Two usage options.

Option 1: In the Hybridized state:

Using the magnifier to read the small print printed on another object, one could simply swivel the magnifying lens away from plastic card to expose the magnifier, holding the magnifying lens between the print and the user's eyes at an appropriate distance from the print.

Option 2: in the non-hybridized or detached state:

To read the small print that is printed on the attached or coupled object's) i.e. the plastic card itself, or any object or objects that is not part of this hybridized coupling, one could simply detach or snap apart the fresnel magnifying lens from its coupling and use it in the detached state to magnify the print holding the lens at an appropriate distance from the print.

When the two individual parts of this new hybridized object are detached, they always behave as separate entities and could perform their individual functions as they were designed or intended. Once the user is finished with the magnifying lens or the card, they could be reattached again for easy storage and carrying.

While the invention has been specifically described with respect to a certain embodiment, modification(s) may be made regarding to the size & shape of fresnel magnifying lens, the preplanned hole(s), the type of fastener(s) used in effecting the coupling, or the type of attached item(s) used in forming of the new hybridized object(s), all without necessarily departing from the spirit and scope of this invention.

I claim:

1. A fresnel magnifying lens in a hand-held pocket-sized hybrid assembly including said lens and another object or objects, wherein said lens is provided with a hole for use with a fastener to detachably or permanently couple said lens to said another object in a manner which allows a selective magnified hand-held viewing, through said lens, of both said another object and of different objects, the coupling of said lens to said another object is such that said lens can be detached from said another object so as to view said another object with said lens and can be slidably moved, using the fastener which is coupling said lens to said another object as a pivot point, to permit said lens to be used to view said different objects which are not part of said hybrid assembly.

2. The fresnel magnifying lens in a hybrid assembly according to claim 1, wherein said hole is built into the fresnel magnifying lens when it is formed or can be subsequently added.

3. The fresnel magnifying lens in a hybrid assembly according to claim 1, wherein the fastener includes a snap, plug, ring, grommet, or rivet.

4. The fresnel magnifying lens in a hybrid assembly according to claim 1, wherein the fastener includes one or more parts made from metal, plastic, a combination of metal and plastic or composite materials.

5. The fresnel magnifying lens in a hybrid assembly according to claim 1, wherein the fastener is a separate entity from the fresnel magnifying lens, or is an integral part of the fresnel magnifying lens or the attached object or objects.

6. The fresnel magnifying lens in a hybrid assembly according to claim 1, wherein the said another object or objects of the pocket-sized hybrid assembly have a planar area and are dimensionally similar to said fresnel magnifying lens, and said object or objects are selected from the group consisting of credit cards, debit cards, identification cards, pocket calendars, schedules and plastic cards, telecards, magnetic note holders, advertising specialty items containing advertising logo and/or messages for marketing of products and services, tags or business cards.

7. A method of providing a hand-held pocket-sized hybrid assembly of a fresnel magnifying lens and another object or objects, said method comprising:

providing said fresnel magnifying lens with a hole provided with a fastener and adapting said another object or objects for application of said fastener thereto; and detachably or permanently coupling said lens to said another object, using said fastener, in manner which allows a selective magnified hand-held viewing, through said lens, of both said another object and of different objects, the coupling of said lens to said another object is such that said lens can be detached from said another object so as to view said another object with said lens and can be slidably moved, using the fastener which is coupling said lens to said another object as a pivot point, to permit said lens to be used to view said different objects which are not part of said hybrid assembly.

* * * * *